US008251041B2

(12) United States Patent  (10) Patent No.: US 8,251,041 B2
Loth  (45) Date of Patent: Aug. 28, 2012

(54) ACCELERATED COMPRESSION IGNITION ENGINE FOR HCCI

(75) Inventor: John Lodewyk Loth, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 62 days.

(21) Appl. No.: 12/932,949

(22) Filed: Mar. 10, 2011

(65) Prior Publication Data

US 2011/0220041 A1  Sep. 15, 2011

Related U.S. Application Data

(60) Provisional application No. 61/339,999, filed on Mar. 11, 2010.

(51) Int. Cl.
*F02B 19/04* (2006.01)
(52) U.S. Cl. ......... 123/289; 123/27 R; 123/253
(58) Field of Classification Search ......... None
See application file for complete search history.

(56) References Cited

U.S. PATENT DOCUMENTS

| | | | |
|---|---|---|---|
| 4,187,808 A | | 2/1980 | Audoux |
| 4,340,016 A | * | 7/1982 | Ehrlich ............ 123/73 R |
| 5,970,944 A | * | 10/1999 | Kawamura ............ 123/258 |
| 6,092,494 A | | 7/2000 | Davis |
| 6,752,105 B2 | | 6/2004 | Gray |
| 7,562,642 B2 | | 7/2009 | Rabhi |
| 2008/0210204 A1 | | 9/2008 | Salzgeber et al. |

* cited by examiner

*Primary Examiner* — Noah Kamen
(74) *Attorney, Agent, or Firm* — Gary J. Morris

(57) ABSTRACT

An internal combustion engine has cylinder wall cavities located near the top dead center stroke end to allow optimizing the compression ratio in first stage compression, as function of fuel octane number used. The volume of the cylinder wall cavities is designed to be adjustable, even when the engine is operating. Using a conventional piston motion, the second stage compression becomes accelerated as soon the upper piston ring seals-off the cylinder wall cavities. This is due to the sudden significant reduction in volume. During the power stroke, after the upper piston ring opens the cylinder wall cavities; their fuel content is ignited by second stage combustion products. Because the torque required during accelerated compression is no greater than during first stage compression, stresses in the crankshaft are no more than in conventional spark ignition engines. This allows small displacement engines to be of light weight and to be hand cranked.

20 Claims, 6 Drawing Sheets

ACCELERATED COMPRESSION IGNITION ENGINE FOR HCCI

CROSS-REFEREENCE TO RELATED APPLICATIONS

This patent application claims priority to provisional patent application 61/339,999 filed on Mar. 11, 2010 which is incorporated by reference herein.

FIELD OF THE INVENTION

The engine disclosed herein operates using accelerated compression ignition in the range from volumetric compression ratio of 20 and above, without knock or associated high $NO_x$ production. This engine is applicable to a wide range of fuels.

BACKGROUND OF THE INVENTION

This patent application claims priority to provisional patent application 61/339,999 filed on Mar. 11, 2010 which is incorporated by reference herein.

There are many different engine cycles based on a piston/cylinder configuration. Each such engine is designed for a specific application. They differ widely in mode of operation, maximum size, engine speed, power output per unit mass, most suitable fuel and method of ignition. Engine fuel efficiency increases with: 1) compression ratio (CR) used; 2) ignition timing control; and 3) fuel combustion rate. A high rate of combustion maximizes combustion compression and minimizes piston ring and valve seat leakage. Many gasoline fueled piston engines are only able to ignite near stoichiometric mixtures and then at limited compression ratio. For decades automotive engineers have made improvements in Diesel fuel injected engines, Homogeneous Charge Spark Ignited Engines, and Homogeneous Charge Compression Ignition (HCCI) engines. HCCI technology eliminates the need for spark plugs and high pressure fuel injectors. However, ignition timing control has been successfully accomplished only over a narrow range in engine speed and load, and this only with the aid of complex computer control over the air/fuel mixture, exhaust gas recirculation (EGR), engine load, and engine speed. In 2009, Ford Motor Company and Mercedes Benz both incorporated a limited utilization of HCCI in their gasoline fueled automotive fleet which resulted in increased combustion rate and thus combustion compression, to improve fuel efficiency. Those computer controlled engines are able to take advantage of HCCI high combustion compression over a limited range of engine speed and power settings.

Recently, new accelerated compression cranking mechanisms have become available, which are capable of producing rapid piston movement near top dead center (TDC). This increases the rate of compression to auto-ignition, to reduce heat loss to the walls and the likelihood of engine knock. Stratifying the charge has been found to be effective but, unfortunately, has been difficult to accomplish at all loads. Accelerated compression ignition can be accomplished even without air inlet throttle valve, and ignite mixtures near TDC under various engine speeds and loads, as required for maximum combustion compression. High compression ratio enables rapid combustion of lean mixtures as needed to limit $NO_x$ formation, but this requires high work and torque input during compression to a high compression ratio. It is well known that reducing the combustion volume and flattening the geometry of the combustion chamber during compression ignition significantly reduces the number of independent ignition centers which lead to engine knock and also minimizes the combustion volume and likelihood of engine knock. This invention avoids a complex cranking mechanism. It requires only a conventional reciprocating engine, with near sinusoidal piston motion. In one embodiment, upper cylinder wall cavities are made by machining a shallow tapered groove, beyond the cylinder wall and connecting this groove by multiple ports to the cylinder inside. In one embodiment, those cavities are sized to equal about half the clearance volume above the piston, at the time the upper two piston rings seal off those wall cavities. The result is doubling the compression ratio from 10:1 to 20:1 when piston reached TDC. This results in timed compression ignition as needed for HCCI use. The air/fuel mixture sealed off inside those cavities is ignited when the piston enters its expansion stroke and exposes those cavities. The slope of the cavity groove facilitates cleaning when the head is removed.

SUMMARY OF THE INVENTION

Slowly burning air-fuel mixtures in the Otto cycle is caused by low compression temperature, low spark energy, even when a near stoichiometric mixture is used. Slow fuel burning in a Diesel cycle is due to time required for fuel injection, droplet vaporization and mixing with air. Complex engines, including those with accelerated cranking mechanisms, are capable of controlling ignition timing in HCCI mixtures. But their mechanical complexity, high cost and limited engine speed prevents widespread usage. This invention requires only a simple and entirely mechanically control over ignition timing. It is based on a two-stage-compression process, with about half the air-fuel mixture being compression-ignited when the piston reached TDC. Soon after expansion the remaining air fuel mixture is ignited by the combustion products when the upper piston opens the cylinder wall cavities. As compression is doubled near TDC, the compression work and torque required are no more than that needed to reach half the final compression ratio. It is exactly this feature of this invention, which control compression ignition timing, at any engine speeds and load and is the reason that knock is avoided. Soon after TDC, during the power stroke, the upper piston ring opens the cylinder wall cavities to allow rapid ignition of remaining air-fuel mixture, by the now available combustion products.

The advantage of using compression ignition energy near TDC is the ability to ignite very lean air-fuel mixtures. This reduces NOx formation and eliminates the need for an air intake throttle valve. However, near idle speed, a throttle valve may still be needed to slow the engine speed. The advantage of using a fuel injector, in one embodiment, is that it enables enriching only that small amount of charge, involved in compression ignition, while not affecting the combustible mixture which is temporarily sealed inside the cylinder wall cavities, thereby providing charge stratification with a conventional steady flow injector. The cylinder wall cavities make a non-sinusoidal relationship possible between compression ratio and crank-angle, with second stage (or greater number of stages) compression/ignition possible. The sinusoidal relationship between compression ratio and crank angle in a conventional diesel engine with CR =20 to 30, peaks at 19° BTDC, with a required torque 187% to 270% higher than for a spark ignition engine at CR=10. Such high cranking torque makes it difficult to warm-up a diesel engine by cranking, unless a valve lifter is used. The high torque associated with cranking/starting a Diesel engine requires the engine to be much stronger and heavier than a spark ignition engine or the cylinder wall cavity engine claimed herein. Cranking torque required during near sinusoidal compression of a CR=10 spark ignition engine is similar to that of the herein claimed second stage compression ignition engine operating at CR 20. Thus, structure and weight will be about the same as a conventional spark ignition engine. Without need for a Diesel type fuel injector, this cycle can be scaled down to a fraction of a cubic inch displacement, for use in UAV's, chain saws, lawnmowers, string trimmers, etc.

Current small two-cycle engines have both inlet and exhaust ports located near the bottom of the piston stroke, and therefore, often use a domed piston to improve scavenging. However, when using cylinder wall cavities as in this invention, an exhaust valve can be added inside the cylinder wall cavity in one embodiment, as shown in FIG. 2, to provide unidirectional scavenging while using a flat piston. In four-cycle applications, the narrow piston to head clearance may delay intake valve opening.

The herein claimed engine configuration with cylinder wall cavities requires fewer parts than a spark ignition engine, has no need for spark plugs in at least one embodiment, can be operated on various fuels with lean mixtures to minimize $NO_x$, and if used with Diesel fuel, may require some preheating of the combustible mixture, It extends engine life and miles per gallon due to the high lubricity and the heating value of diesel fuel.

DETAILED DESCRIPTION

The configurations in the description and drawings in no way are meant to limit the physical configuration of the possible embodiments of internal combustion engines that may operate as described herein.

A spreadsheet calculation was used to quantify and graph typical compression performance parameters of a 500 cc displacement engine, operating on four different ideal cycles listed below.
1) Otto spark ignition at compression ratio CR=10,
2) Diesel compression ignition at CR=20
3) ACIE-20/12 is an abbreviation for: Accelerated Compression Ignition Engine in a spreadsheet with CR=20 at TDC and cylinder wall cavities closing at 12° before TDC.
4) ACIE-20/18 an abbreviation for: Engine with Cylinder-Wall-Cavities (CWC) in a spreadsheet with CR=20 at TDC and cylinder wall cavities closing at 18° before TDC.

Figure 3:
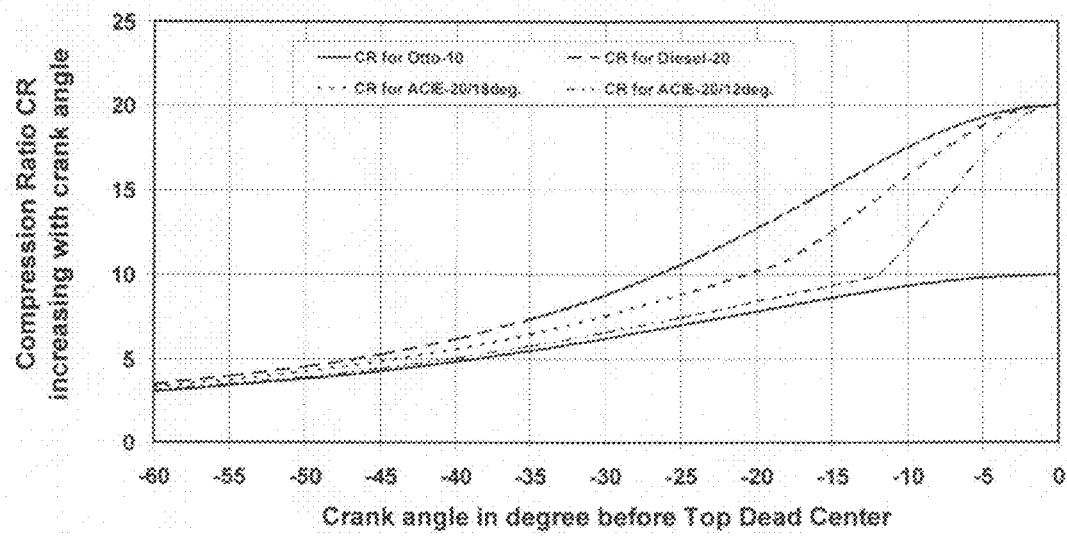
FIG. 3 is a graphical presentation of how the Compression Ratio (CR) increases during the compression stroke in the final 60 degrees of crank angle before TDC.
Figure 6:
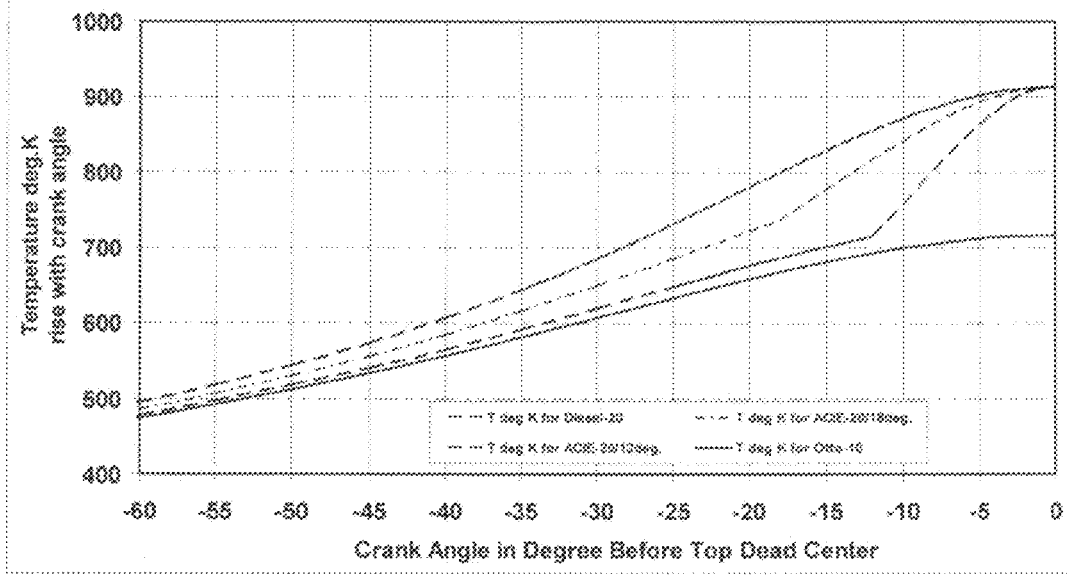
FIG. 6 is a graphical presentation of how the temperature in degree K increases during the compression stroke in the final 60 degrees of crank angle before TDC.

A spreadsheet calculation was used to calculate and graph the ideal performance during the compression stroke of four cycles shown in FIG. 3 though FIG. 6. It assumed operation with a homogeneous mixture of regular gasoline and air, where an ideal spark ignition Otto cycle is limited to operation with a compression ratio CR=10 and air inlet temperature T at bottom dead center (BDC) equals 300 degree Kelvin and pressure p=100,000 Pa. Those numbers were used to be able to compare important parameters like: required cranking torque and work done in units of N–m. The following non-limiting example cylinder and stroke dimensions were used for those calculations:

Piston stroke=10 cm, with an infinitely long piston connecting rod.
Piston area=50 square cm. This correlates to a piston displacement of 0.5 liter.
For ACIE-20/12, cylinder wall cavities volume was made 0.09 times piston displacement.
Minimum above piston clearance volume was made 0.0107 times piston displacement.
For ACIE-20/18, cylinder wall cavities volume was made 0.0946 times piston displacement Minimum above piston clearance volume to piston displacement ratio=0.0054

Figure 1:
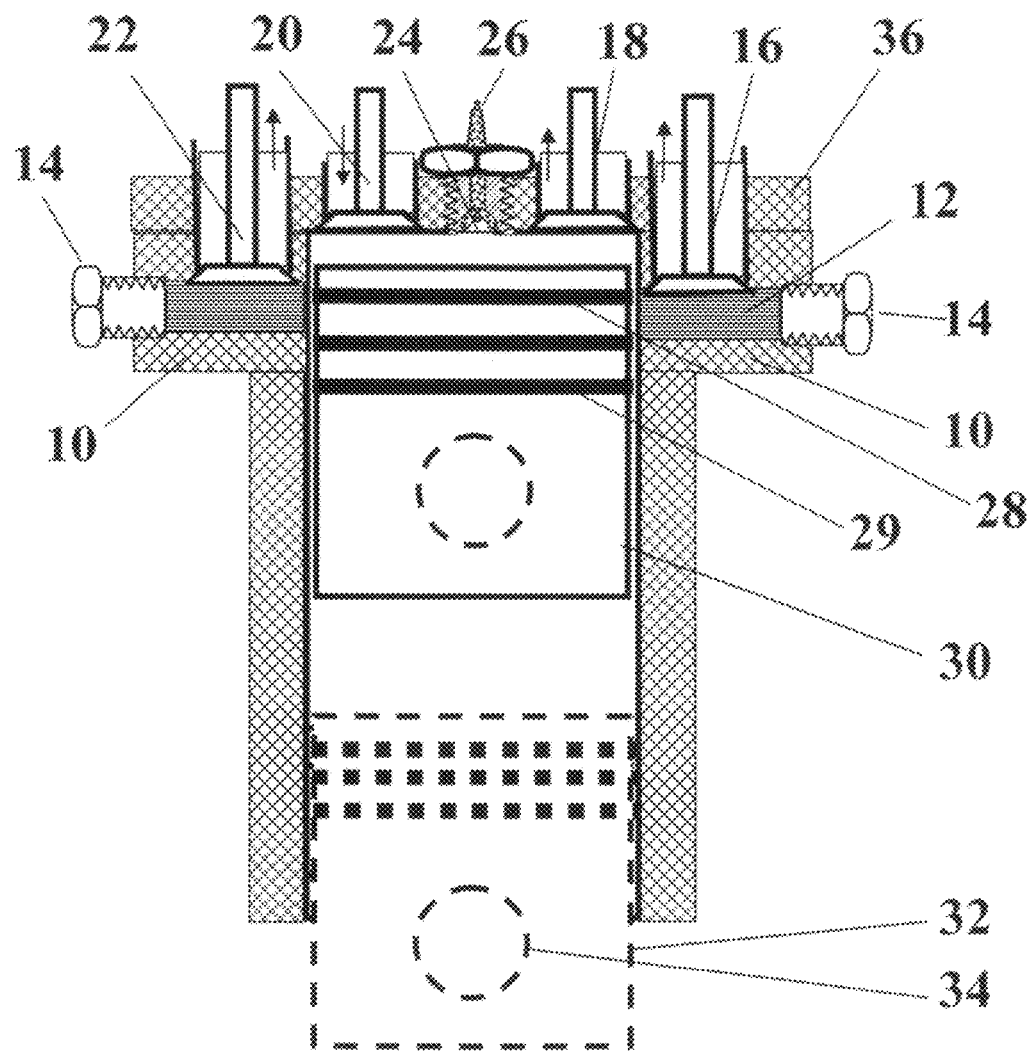
FIG. 1 is a schematic cross-section of a four-cycle (four stroke cycle) engine designed for operation as described herein.

FIG. 1 is a schematic cross section of a four-cycle engine designed for operation in the herein claimed cycle. Thickened cylinder wall 10 is needed to install insulated cylinder wall cavities 12. For adjustment of the cavity volume, externally accessible cavity volume adjustment bolts 14 can be used in one embodiment. Adjustment of volume adjustment bolts 14 can be performed prior to engine operation or during engine operation. Due to the high compression ratio needed, the inlet and outlet valve clearance between the nearly flat cylinder head 36 and piston 30 at TDC is limited. Therefore exhaust valve 18 above piston 30 may have to delay opening until the piston clearance has increased sufficiently. Then it may be advantageous to add an additional exhaust valve 16 inside one or more of cavities 12. A similar situation applies to intake valve 20 positioned above the piston 30 and optional intake valve 22 located inside cylinder wall cavity 12. To minimize engine knock the clearance between the flat-top piston 30, with rounded edges, and the nearly flat cylinder head 36 should be minimized. To minimize engine knock, compression ignition is induced to originate on the centerline of piston 30. Therefore, a nearly hemispherical insulated cavity 24 is installed inside the middle of the nearly flat cylinder head 36 on the bottom of a removable plug 26 which can be used to provide transducer access to the combustible mixture for pressure monitoring, gas sampling or for spark ignition if desired in one embodiment. The upper piston ring 28 is shown with piston 30 in position to just close off cylinder wall cavities 12 during a compression stroke. The lower piston ring 29 seals the cylinder wall cavity 12 on the opposite side of the cavity opening in relation to the upper piston ring 28. Intermediate piston rings may be positioned between the upper piston ring 28 and the lower piston ring 29. The piston is shown in the bottom dead center position 32 with piston wrist pin 34 used to connect to the crankshaft connecting rod (not shown).

A cylinder bounded by a cylinder wall and a nearly flat cylinder head 36 forming a cylinder volume of variable size is fitted with a moveable piston 30 within the cylinder. The piston 30 is fitted with at least an upper piston ring 28 and a lower piston ring 29. At least one cylinder wall cavity 12 located within the cylinder wall, the cylinder wall cavity 12 is in pneumatic communication with the cylinder volume unless the cylinder wall cavity 12 is sealed by at least the upper piston ring 28. First stage compression of a fuel-air mixture within the cylinder occurs as the compression stroke begins. A portion of a fuel and air mixture within the cylinder volume is captured within the cylinder wall cavity 12 as the piston 30 moves in the cylinder compressing the mixture whereby the captured portion of the mixture is sealed within the wall cavity and separated from the cylinder volume by at least the upper piston ring 28. The piston 30 moves further in the compression stroke resulting in second stage, accelerated compression of the remaining mixture in the cylinder volume to a higher pressure than the captured mixture within the cylinder wall cavity 12 whereby ignition of the remaining mixture in the cylinder volume occurs at the higher pressure. The second stage compression is accelerated compared to the first stage compression since a portion of the cylinder volume is partitioned from the original cylinder volume when the cylinder wall cavity 12 is sealed by at least the upper piston ring 28. The piston reverses direction after reaching top dead center and the captured mixture in the cylinder wall cavity 12 is ignited as the upper piston ring 28 unseals the cylinder wall cavity 12 thereby adding energy to expanding gas within the cylinder. It is noted that the term "upper piston ring" used herein refers to the piston ring most closely located to the surface of the piston which experiences combustion of the fuel/air mixture and the term "lower piston ring" used herein refers to the piston ring located the furthest from the upper piston ring. The terms "upper piston ring" and "lower piston ring" are not meant to teach directly or indirectly a preferential orientation of the engine or piston therein.

Figure 2:
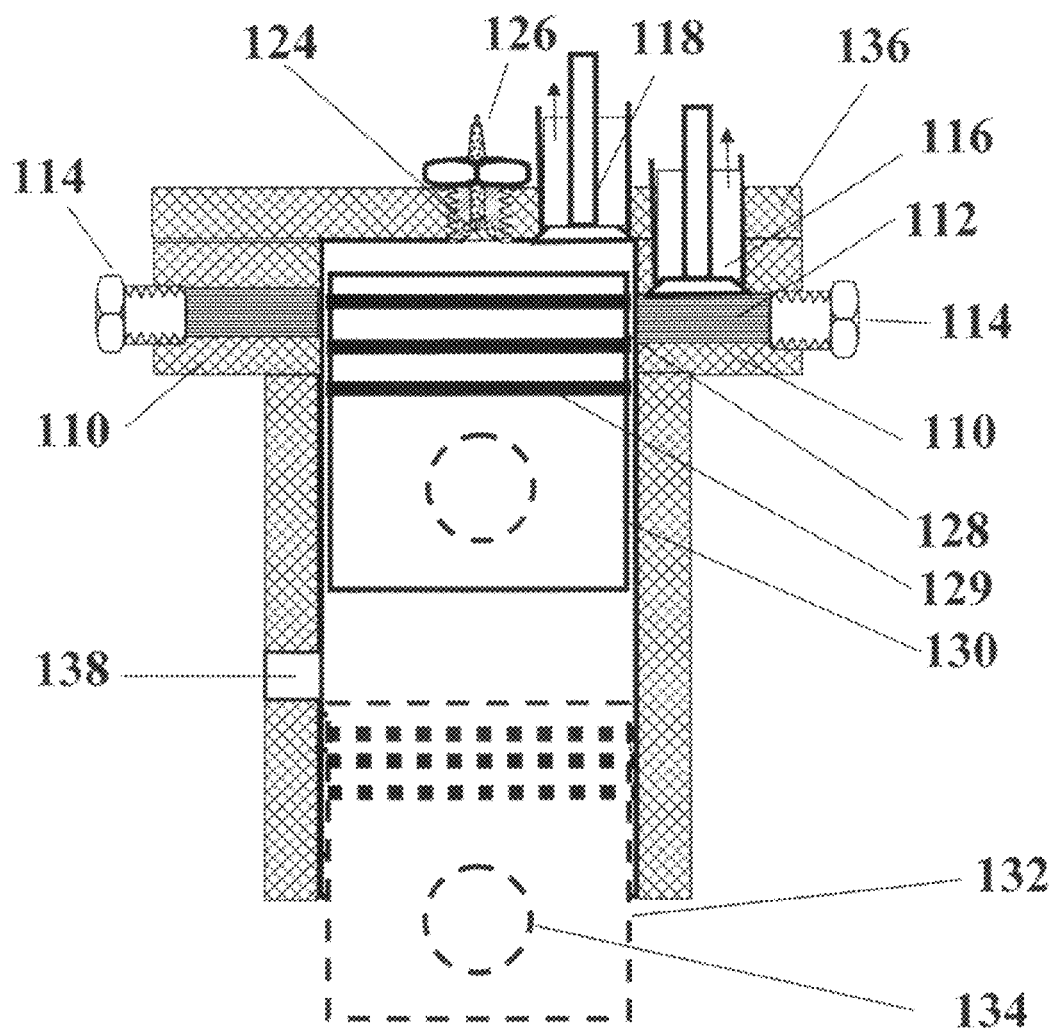
FIG. 2 is a schematic cross-section of a two-cycle (two stroke cycle) engine designed for operation as described herein.

FIG. 2 is a schematic cross-section of a two-cycle engine designed for operation in the herein claimed cycle. Thickened cylinder wall 110 is needed to install insulated cavities 112. For adjustment of the cavity volume, externally accessible cavity volume adjustment bolts 114 can be used. Adjustment of volume adjustment bolts 114 can be performed prior to engine operation or during engine operation. Due to the high compression ratio needed, the inlet and outlet valve clearance between cylinder head and piston at TDC is limited. Therefore, exhaust valve 118 above piston may have to delay opening until the piston clearance has increased sufficiently. Then it may be advantageous to add an additional exhaust valve 116 inside one or more of cavities 112. When the crank case compressed inlet air/fuel mixture enters through intake port 138, with piston 132 at bottom dead center, cylinder scavenging is greatly improved using the now open exhaust valves 116 and 118, by providing unidirectional scavenging. To minimize engine knock, the clearance between the flat top piston 130, with rounded edges, and the near flat cylinder head 136 should be minimized. To minimize engine knock, compression ignition is induced to originate on the centerline of piston 130. Therefore a nearly hemispherical insulated cavity 124 is installed inside the middle of the nearly flat cylinder head 136 on the bottom of a removable plug 126 which can be used to provide transducer access to the combustible mixture for pressure monitoring, gas sampling or for spark ignition if desired. Upper piston ring 128 is shown with piston 130 in position to just close off cylinder wall cavities 112. The lower piston ring 129 seals the cylinder wall cavity 112 on the opposite side of the cavity opening in relation to the upper piston ring 128. Intermediate piston rings may be positioned between the upper piston ring 128 and the lower piston ring 129. The piston 130 is shown in the bottom dead center position by 132 with piston pin 134 used to connect to the crankshaft connecting rod (not shown). It is noted that the term "upper piston ring" used herein refers to the piston ring most closely located to the surface of the piston which experiences combustion of the fuel/air mixture and the term "lower piston ring" used herein refers to the piston ring located the furthest from the upper piston ring. The terms "upper piston ring" and "lower piston ring" are not meant to teach directly or indirectly a preferential orientation of the engine or piston therein.

FIG. 3 is a graphical presentation of how the Compression Ratio (CR) increases during the compression stroke, in the final 60 degrees of crank angle before TDC. The line referring to each engine is identified by the nomenclature on each graph. The upper line refers to the diesel engine and the lower line to the spark ignition engine. The two lines in between belong to the ACIE engines. The upper of those two lines starts to rise at 18° BTDC and the lower of those lines starts to rise at 12° BTDC. This plot line configuration applies to all FIGS. 3-6.

Figure 4:
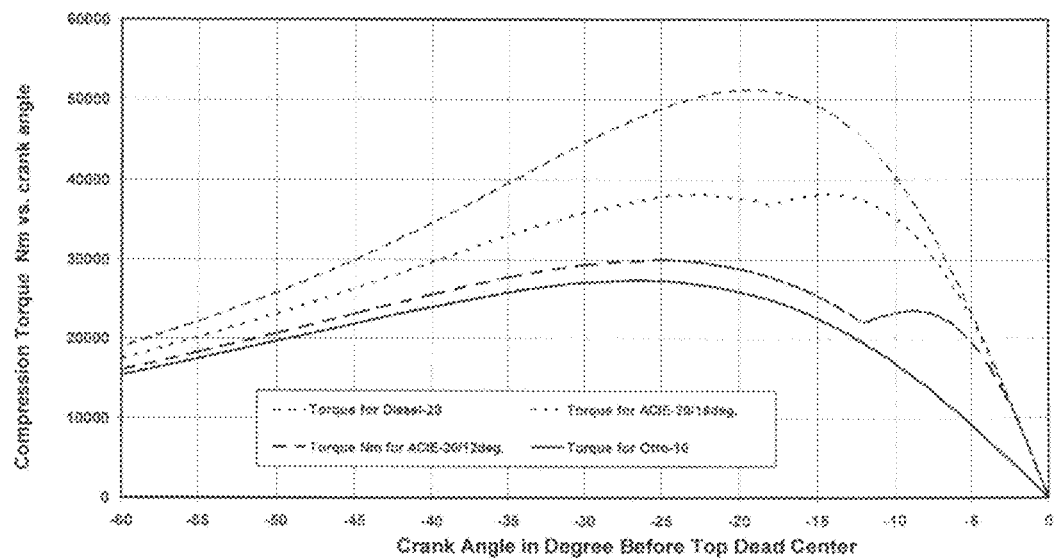
FIG. 4 is a graphical presentation of how the Compression Torque (CT) varies during the compression stroke in the final 60 degrees of crank angle before TDC.

FIG. 4 is a graphical presentation of how the required compression torque in N–m, increases during the compression stroke in the final 60 degrees of crank angle before TDC.

Figure 5:
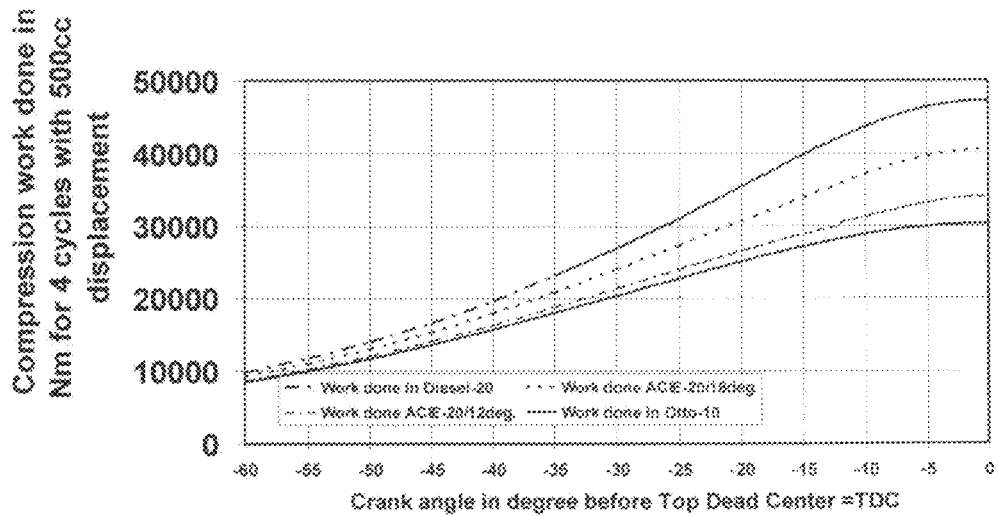
FIG. 5 is a graphical presentation of how the required Compression Work WC in N–m, increases during the compression stroke in the final 60 degrees of crank angle before TDC.

FIG. 5 is a graphical presentation of how the required compression work in N–m, increases during the compression stroke in the final 60 degrees of crank angle before TDC.

FIG. 6 is a graphical presentation of how the combustible mixture temperature increases during the compression stroke in the final 60 degrees of crank angle before TDC.

It is understood that the ideal calculation results shown in FIGS. 3-6 are for illustration purposes for one specific engine size and geometry. The calculations and results are merely intended to demonstrate the benefits of the instant invention compared to conventional engines cycles and are in no way intended to limit the application of the teachings herein.

The various embodiments described herein are merely descriptive of the present invention and are in no way intended to limit the scope of the invention. Modifications of the present invention will become obvious to those having skill in the art in light of the detailed description herein, and such modifications are intended to fall within the scope of the appended claims.

I claim:

1. An internal combustion engine apparatus comprising:
    a cylinder bounded by a cylinder wall and a cylinder head forming a cylinder volume of variable size fitted with a moveable piston within the cylinder;
    the piston is fitted with at least an upper piston ring and a lower piston ring;
    the piston is connected to a crankshaft by a connecting rod;
    a cylinder wall cavity located within the cylinder wall, the cylinder wall cavity is in pneumatic communication with the cylinder volume unless the cylinder wall cavity is sealed by at least the upper piston ring;
    a portion of a fuel and air mixture within the cylinder volume is captured within the cylinder wall cavity as the piston moves in the cylinder compressing the mixture whereby the captured portion of the mixture is sealed within the wall cavity and separated from the cylinder volume by at least the upper piston ring;
    the piston moves further compressing the remaining mixture in the cylinder volume to a higher pressure than the captured mixture within the wall cavity whereby ignition of the remaining mixture in the cylinder volume occurs at the higher pressure;
    the piston reverses direction after reaching top dead center and the captured mixture in the wall cavity is ignited as the upper piston ring unseals the wall cavity thereby adding energy to expanding gas within the cylinder; and
    as the piston moves, the connecting rod turns the crankshaft.

2. The internal combustion engine apparatus of claim 1 whereby the ignition of the mixture at the higher pressure is caused by compression ignition.

3. The internal combustion engine apparatus of claim 1 whereby the ignition of the remaining mixture in the cylinder volume is initiated by a spark plug.

4. The internal combustion engine apparatus of claim 1 whereby the engine operates on a four-stroke cycle.

5. The internal combustion engine apparatus of claim 1 whereby the engine operates on a two-stroke cycle.

6. The internal combustion engine apparatus of claim 1 whereby the cylinder wall cavity is thermally insulated.

7. The internal combustion engine apparatus of claim 5 whereby scavenging is facilitated by flow of fresh charge entering at near piston bottom dead center to drive exhaust gas out through cylinder head valves and inside cylinder wall cavities.

8. An internal combustion engine apparatus comprising:
a cylinder bounded by a cylinder wall and a cylinder head forming a cylinder volume fitted with a moveable piston within the cylinder;
the piston is fitted with at least an upper piston ring and a lower piston ring;
a cylinder wall cavity located within the cylinder wall, the cylinder wall cavity is in pneumatic communication with the cylinder volume unless the cylinder wall cavity is sealed by at least the upper piston ring;
a portion of a fuel and air mixture within the cylinder volume is captured within the cylinder wall cavity as the piston moves in the cylinder compressing the mixture;
the piston moves further compressing the remaining mixture in the cylinder volume to a higher pressure than the captured mixture within the wall cavity;
ignition of the remaining mixture in the cylinder volume occurs at the higher pressure;
the upper piston ring unseals the wall cavity during a power stroke whereupon ignition of the captured mixture ignites, adding energy to expanding gas within the cylinder.

9. The internal combustion engine apparatus of claim 8 whereby the ignition of the mixture at the higher pressure is caused by compression ignition.

10. The internal combustion engine apparatus of claim 8 whereby the ignition of the remaining mixture in the cylinder volume is initiated by a spark plug.

11. The internal combustion engine apparatus of claim 8 whereby the engine operates on a four-stroke cycle.

12. The internal combustion engine apparatus of claim 8 whereby the engine operates on a two-stroke cycle.

13. The internal combustion engine apparatus of claim 8 whereby the cylinder wall cavity is thermally insulated.

14. The internal combustion engine apparatus of claim 12 whereby scavenging is facilitated by flow of fresh charge entering at near piston bottom dead center to drive exhaust gas out through cylinder head valves and inside cylinder wall cavities.

15. An internal combustion engine apparatus with accelerated compression comprising:
a cylinder bounded by a cylinder wall and a cylinder head forming a cylinder volume fitted with a moveable piston within the cylinder;
the piston is fitted with at least an upper piston ring;
a cylinder wall cavity located within the cylinder wall;
the cylinder wall cavity is in pneumatic communication with the cylinder volume and comprises a portion of the cylinder volume unless the cylinder wall cavity is sealed by at least the upper piston ring;
first stage compression occurs within the cylinder as a compression stroke begins;
second stage compression occurs within the cylinder after the cylinder wall cavity is sealed by at least the upper piston ring as the compression stroke continues; and
the second stage compression is accelerated compared to the first stage compression due to the sealing of the cylinder wall cavity by at least the upper piston ring.

16. The internal combustion engine with accelerated compression apparatus of claim 15 whereby the engine operates on a four-stroke cycle.

17. The internal combustion engine with accelerated compression apparatus of claim 15 whereby the engine operates on a two-stroke cycle.

18. The internal combustion engine with accelerated compression apparatus of claim 15 whereby the cylinder wall cavity is thermally insulated.

19. The internal combustion engine with accelerated compression apparatus of claim 17 whereby scavenging is facilitated by flow of fresh charge entering at near piston bottom dead center to drive exhaust gas out through cylinder head valves and through the cylinder wall cavity.

20. The internal combustion engine with accelerated compression apparatus of claim 15 wherein the upper piston ring unseals the cylinder wall cavity during a power stroke whereupon ignition of a captured fuel-air mixture within the cylinder wall cavity ignites, adding energy to expanding gas within the cylinder.

* * * * *